(12) United States Patent
Park et al.

(10) Patent No.: US 8,755,326 B2
(45) Date of Patent: Jun. 17, 2014

(54) REPEATER APPARATUS FOR SIMULTANEOUSLY TRANSCEIVING SIGNALS IN A WIRELESS COMMUNICATION SYSTEM, AND METHOD FOR SAME

(75) Inventors: Kyu Jin Park, Anyang-si (KR); Sung Ho Moon, Anyang-si (KR); Yeong Hyeon Kwon, Anyang-si (KR); Jae Hoon Chung, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 13/513,844

(22) PCT Filed: Dec. 10, 2010

(86) PCT No.: PCT/KR2010/008851
§ 371 (c)(1),
(2), (4) Date: Jun. 4, 2012

(87) PCT Pub. No.: WO2011/071337
PCT Pub. Date: Jun. 16, 2011

(65) Prior Publication Data
US 2012/0236783 A1    Sep. 20, 2012

Related U.S. Application Data

(60) Provisional application No. 61/285,192, filed on Dec. 10, 2009.

(30) Foreign Application Priority Data

Dec. 10, 2010   (KR) ......................... 10-2010-0126280

(51) Int. Cl.
*H04J 3/08*    (2006.01)

(52) U.S. Cl.
USPC ........................................... 370/315; 370/328

(58) Field of Classification Search
USPC ......................................................... 370/315
See application file for complete search history.

(56) References Cited

U.S. PATENT DOCUMENTS 8,472,366 B2 * 6/2013 Xu et al. ...................... 370/315
2010/0323612 A1 * 12/2010 Xu et al. ........................... 455/7

(Continued)

OTHER PUBLICATIONS

Peters et al. "The Future of WiMAX: Multihop Relaying with IEEE 802.16j", IEEE Communications Magazine, pp. 104-111, Jan. 2009.

(Continued)

*Primary Examiner* — Anh-Vu Ly
*Assistant Examiner* — Abdullahi Ahmed
(74) *Attorney, Agent, or Firm* — McKenna Long & Aldridge, LLP

(57) ABSTRACT

Disclosed are a base station apparatus and a repeater apparatus for transceiving signals in a wireless communication system. The repeater apparatus comprises: a receiver which receives a signal from a base station through a first region of a first downlink subframe in a component carrier that supports first and second wireless communication schemes; and a transmitter which transmits, through a second region of the first downlink subframe, a signal to one or more terminals of one or more first type of terminals which use the first wireless communication scheme and one or more second type of terminals which use the second wireless communication scheme, simultaneously with said reception of the signal. Here, the first region and the second region are multiplexed in the first downlink subframe in accordance with a frequency division multiplexing (FDM) scheme.

12 Claims, 12 Drawing Sheets

(56) References Cited

U.S. PATENT DOCUMENTS

| | | | |
|---|---|---|---|
| 2011/0200137 A1* | 8/2011 | Han et al. | 375/295 |
| 2011/0268046 A1* | 11/2011 | Choi et al. | 370/329 |
| 2012/0092982 A1* | 4/2012 | Nakao et al. | 370/216 |

OTHER PUBLICATIONS

Liang et al. "A novel frequency reuse scheme for OFDMA based relay enhanced cellular network", 2009 IEEE 69$^{th}$ Vehicular Technology Conference (VTC Spring 2009), Apr. 29, 2009.

Saito et al. "Trends in LTE/WIMax Systems", Fujitsu Sci. Tech. J., vol. 45, No. 4, pp. 355-362, Oct. 2009.

Notrtel: "Discussion paper on the control channel and data channel optimization for relay link", 3GPP Draft; R1-091384(NORTEL_CONTROL_DATA_RELAY_LINK_DESIGN_IN_LTE-A), 3rd Generation Partnership Project (3GPP), Mobile Competence Centre; 650, Route Des Lucioles; F-06921 Sophia-Antipolis Cedex; France, no. Seoul, Korea; Mar. 17, 2009, XP050338973.

"Support of Rel-8 UEs by LTE-A Relays", 3GPP Draft; R1-084384, 3rd Generation Partnership Project (3GPP), Mobile Competence Centre; 650, Route Des Lucioles; F-06921 Sophia-Antipolis Cedex; France, vol. RAN WG1, no. Prague, Czech Republic; 20081110-20081114, Nov. 7, 2008, XP050597143.

Ericsson: "A discussion on some technology components for LTE-Advanced", 3GPP Draft; R1-082024 {LTE-Advanced Technology Components}, 3rd Generation Partnership Project (3GPP), Mobile Competence Centre; 650, Route Des Lucioles; F-06921 Sophia-Antipolis Cedex; France, vol. RAN WG1, no. Kansas City, US; 20080505, May 14, 2008, XP050488853.

* cited by examiner (a)

(b)

(a)

(b)

(a)

(b)

(a)

(b)

(a)

(b)

(a)

(a)

(a)

(b)

REPEATER APPARATUS FOR SIMULTANEOUSLY TRANSCEIVING SIGNALS IN A WIRELESS COMMUNICATION SYSTEM, AND METHOD FOR SAME

This application is a 35 U.S.C. §371 National Stage entry of International Application No. PCT/KR2010/008851, filed on Dec. 10, 2010, and claims the benefit of U.S. Provisional Application Ser. No. 61/285,192, filed on Dec. 10, 2009, and Korean Patent Application No. 10-2010-0126280, filed Dec. 10, 2010, all of which are incorporated by reference in their entirety herein.

TECHNICAL FIELD

The present invention relates to wireless communication, and more particularly, to a relay node apparatus for simultaneously transmitting and receiving a signal, a method thereof, and a base station apparatus supporting the same.

BACKGROUND ART

As an example of a mobile communication system to which the present invention is applicable, a $3^{rd}$ Generation Partnership Project (3GPP) Long Term Evolution (LTE) or LTE-advanced (hereinafter, LTE-A) communication system will be schematically described.

One or more cells may exist per eNB. The cell is set to use a bandwidth such as 1.25 MHz, 2.5 MHz, 5 MHz, 10 MHz, 15 MHz or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQuest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth and introduction of a relay node.

The LTE-A system aims to support a wideband of a maximum of 100 MHz. The LTE-A system uses carrier aggregation or bandwidth aggregation technology which achieves the wideband using a plurality of frequency blocks. Carrier aggregation enables a plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

In an LTE-A system, although a relay node has been introduced for the purpose of expanding cell coverage, complementing a shadow area, and improving throughput of a cell boundary, the relay node may not simultaneously transmit and receive a signal via an access link and a backhaul link. However, such a problem has not been solved.

DISCLOSURE

Technical Problem

An object of the present invention is to provide a method of transmitting and receiving a signal at a relay node in a wireless communication system.

Another object of the present invention is to provide a relay node apparatus for simultaneously transmitting and receiving a signal in a wireless communication system.

The technical problems solved by the present invention are not limited to the above technical problems and those skilled in the art may understand other technical problems from the following description.

Technical Solution

The object of the present invention can be achieved by providing a method of transmitting and receiving a signal at a relay node in a wireless communication system, including receiving a signal from a base station via a first region of a first downlink subframe on a component carrier supporting first and second wireless communication schemes and, at the same time, transmitting a signal to one or more of at least one or more first type user equipment (UE) using the first wireless communication scheme and at least one second type UE using the second wireless communication scheme via a second region of the first downlink subframe, wherein the first and second regions are regions multiplexed by a frequency division multiplexing (FDM) scheme in the first downlink subframe.

The first region may include two regions multiplexed using the FDM scheme in the first downlink subframe, and the two regions may be located at both edges of a bandwidth of the component carrier.

In another aspect of the present invention, there is provided a method of transmitting and receiving a signal at a relay node in a wireless communication system, including transmitting a signal to a base station via a first region of a first uplink subframe on a component carrier supporting first and second wireless communication schemes and, at the same time, receiving a signal from one or more of at least one first type user equipment (UE) using the first wireless communication scheme and at least one second type UE using the second wireless communication scheme via a second region of the first uplink subframe, wherein the first and second regions are regions multiplexed by a frequency division multiplexing (FDM) scheme in the first uplink subframe.

The first region may include two regions multiplexed using the FDM scheme in the first uplink subframe, and the two regions may be located at both edges of a bandwidth of the component carrier.

In another aspect of the present invention, there is provided a relay node apparatus for transmitting and receiving a signal in a wireless communication system, including a receiver configured to receive a signal from a base station via a first region of a first downlink subframe on a component carrier supporting first and second wireless communication schemes, and a transmitter configured to transmit a signal to one or more of at least one first type user equipment (UE) using the first wireless communication scheme and at least one second type UE using the second wireless communication scheme via a second region of the first downlink subframe, simultaneously with the reception, wherein the first and second regions are regions multiplexed by a frequency division multiplexing (FDM) scheme in the first downlink subframe.

In another aspect of the present invention, there is provided a relay node apparatus for transmitting and receiving a signal in a wireless communication system, including a transmitter configured to transmit a signal to a base station via a first region of a first uplink subframe on a component carrier supporting first and second wireless communication schemes, and a receiver configured to receive a signal from one or more of at least one first type user equipment (UE) using the first wireless communication scheme and at least one second type UE using the second wireless communication scheme via a second region of the first uplink subframe, simultaneously the transmission, wherein the first and second regions are regions multiplexed by a frequency division multiplexing (FDM) scheme in the first uplink subframe.

Advantageous Effects

According to the present invention, a relay node can efficiently transmit a signal to a user equipment (UE) via an access link while receiving a signal from a base station (eNB) via a backhaul signal without interference.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details. For example, although, in the following description, it is assumed that the mobile communication system is a 3$^{rd}$ Generation Partnership Project (3GPP) Long Term Evolution (LTE) or LTE-A system, the present invention is applicable to other mobile communication systems excluding the unique matters of the 3GPP LTE or LTE-A system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE), a mobile station (MS) or an advanced mobile station (AMS), and a base station includes a node of a network end communicating with a terminal, such as a Node-B, an eNode B, a base station or an access point (AP). A repeater may be called a relay node (RN), a relay station (RS), a relay, etc.

In a mobile communication system, a UE and a relay node may receive information from an eNB in downlink and a UE and a relay node may transmit information to an eNB in uplink. Information transmitted or received by a UE or a relay node includes data and a variety of control information and various physical channels exist according to the kinds and usage of information transmitted or received by the UE or the relay node. In the present specification, a UE using a wireless communication scheme of an LTE system is referred to as an "LTE UE" and a UE using a wireless communication scheme of an LTE-A system is referred to as an "LTE-A UE".

Figure 1:
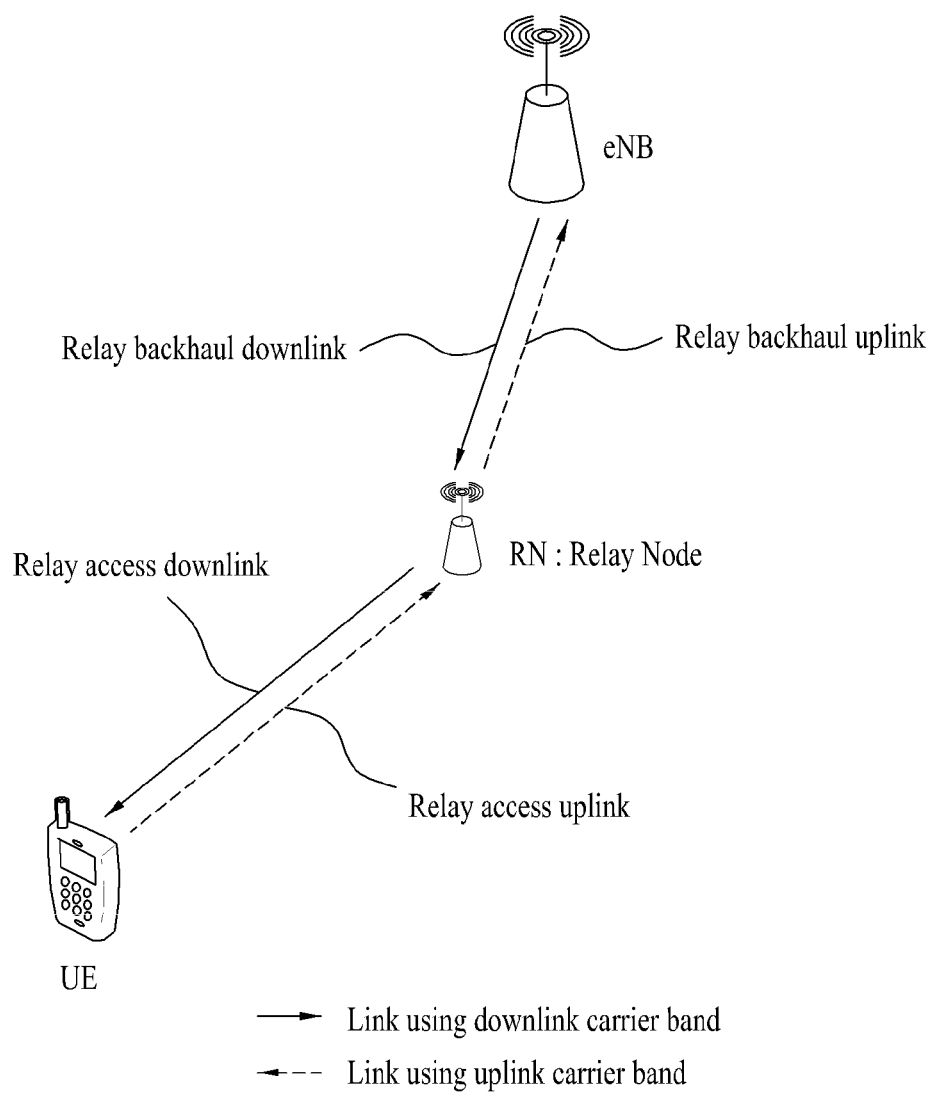
FIG. 1 is a diagram showing the configuration of a relay backhaul link and a relay access link in a wireless communication system.

FIG. 1 is a diagram showing the configuration of a relay backhaul link and a relay access link in a wireless communication system.

Referring to FIG. 1, in an LTE-A system, as a role of forwarding a link between an eNB and a UE to a relay node is introduced, two links having different attributes are applied to uplink and downlink carrier frequency bands. A link part between an eNB and a relay node is defined as a backhaul link. Transmission performed using downlink resources in a frequency division duplex (FDD) or time division duplex (TDD) scheme is referred to as backhaul downlink and transmission performed using uplink resources in a FDD or TDD scheme is referred to as backhaul uplink.

A relay node may receive information from an eNB via relay backhaul downlink and transmit information to an eNB via relay backhaul uplink. In addition, the relay node may transmit information to a UE via relay access downlink and receive information from a UE via relay access uplink.

Figure 2:
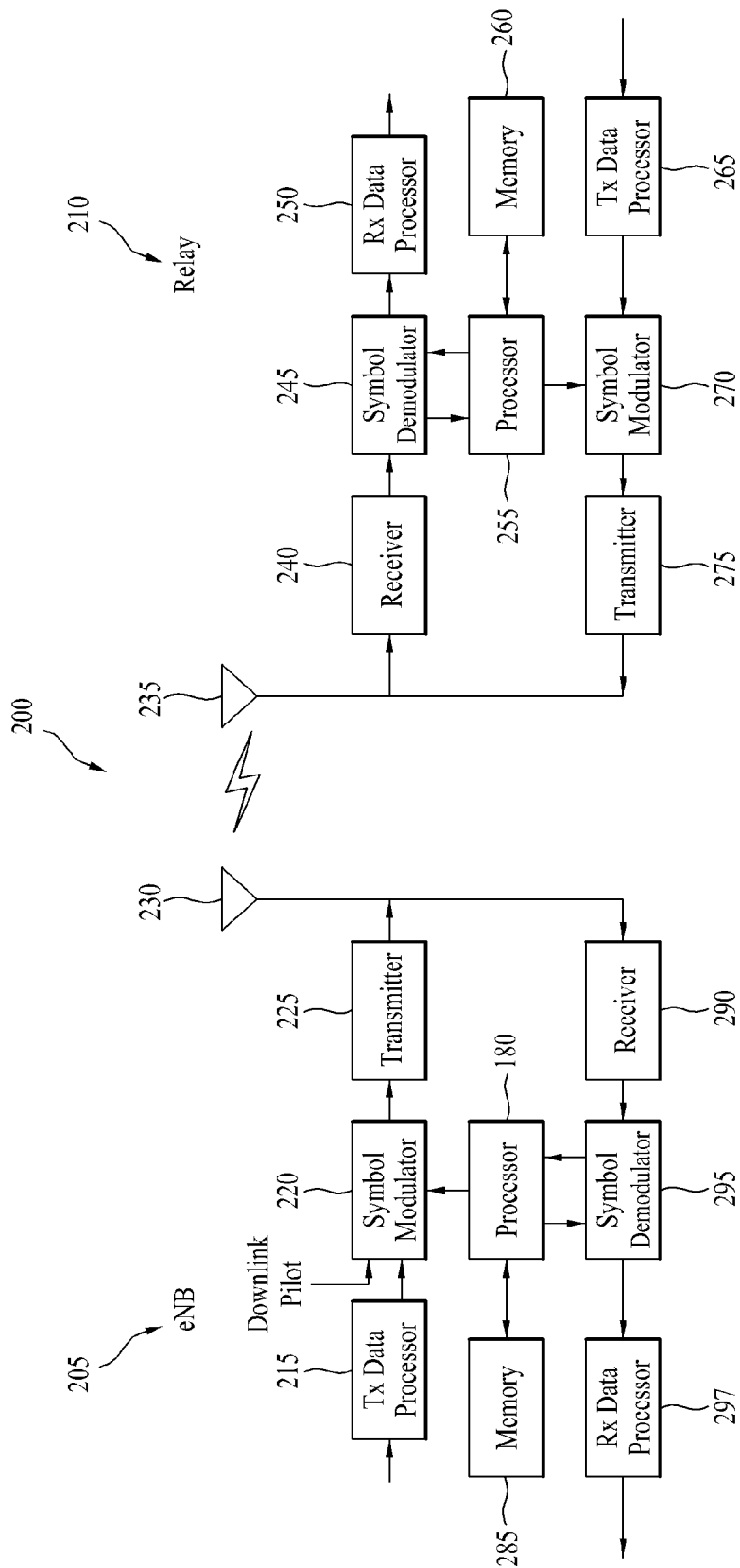
FIG. 2 is a block diagram showing the configuration of an eNB 205 and a relay node 210 in a wireless communication system 200.

FIG. 2 is a block diagram showing the configuration of an eNB 205 and a relay node 210 in a communication system 200 according to the present invention.

Although one eNB 205 and one relay node 210 are shown in order to simplify the wireless communication system 200, the wireless communication system 200 may include one or more eNBs and/or one or more relay nodes.

Referring to FIG. 2, the eNB 205 may include a transmission (Tx) data processor 215, a symbol modulator 220, a transmitter 225, a Tx/Rx antenna 230, a processor 280, a memory 285, a receiver 290, a symbol demodulator 295 and a reception (Rx) data processor 297. The relay node 210 may include a Tx data processor 265, a symbol modulator 270, a transmitter 275, a Tx/Rx antenna 235, a processor 255, a memory 260, a receiver 240, a symbol demodulator 255 and an Rx data processor 250. Although one antenna 230 and one antenna 235 are respectively shown as being included in the eNB 205 and the relay node 210, each of the eNB 205 and the relay node 210 may include a plurality of antennas. Accordingly, the eNB 205 and the relay node 210 according to the present invention support a multiple input multiple output (MIMO) system. The eNB 205 according to the present invention may support both a single user (SU)-MIMO scheme and a multi user (MU)-MIMO scheme.

In downlink, the Tx data processor 215 receives traffic data, formats and codes the received traffic data, interleaves and modulates (or symbol-maps) the coded traffic data, and provides modulated symbols ("data symbols"). The symbol modulator 220 receives and processes the data symbols and pilot symbols and provides a stream of the symbols.

The symbol modulator 220 multiplexes data and pilot symbols and transmits the multiplexed data and pilot symbols to the transmitter 225. At this time, each transmitted symbol may include a data symbol, a pilot symbol, or a null signal value. The pilot symbols may be contiguously transmitted in symbol periods. The pilot symbols may include frequency division multiplexing (FDM) symbols, orthogonal frequency division multiplexing (OFDM) symbols, time division multiplexing (TDM) symbols or code division multiplexing (CDM) symbols.

The transmitter 225 receives the stream of the symbols, converts the stream into one or more analog signals, and additionally adjusts (e.g., amplifies, filters and frequency up-converts) the analog signals, thereby generating a downlink signal suitable for transmission through a radio channel. Subsequently, the downlink signal is transmitted to a UE through the antenna 230.

The configuration of the relay node 210 will now be described. The antenna 235 of the relay node receives a downlink signal from the eNB 205 and provides the received signal to the receiver 240. The receiver 240 adjusts (for example, filters, amplifies, and frequency down-converts) the received signal, digitizes the adjusted signal, and acquires samples. The symbol demodulator 245 demodulates the received pilot symbols and provides the demodulated pilot signals to the processor 255, for channel estimation.

The symbol demodulator 245 receives a frequency response estimation value for downlink from the processor 255, performs data demodulation with respect to the received data symbols, acquires data symbol estimation values (which are estimation values of the transmitted data symbols), and provides the data symbol estimation values to the Rx data processor 250. The Rx data processor 250 demodulates (that is, symbol-demaps), deinterleaves and decodes the data symbol estimation values and restores the transmitted traffic data.

The processes by the symbol demodulator 245 and the Rx data processor 250 are complementary to the processes by the symbol modulator 220 and the Tx data processor 215 of the eNB 205.

In the relay node 210, the Tx data processor 265 processes traffic data and provides data symbols in uplink. The symbol modulator 270 receives the data symbols, multiplexes the data symbols with pilot symbols, performs modulation, and provides a stream of symbols to the transmitter 275. The transmitter 275 receives and processes the stream of symbols, generates an uplink signal, and transmits the uplink signal to the eNB 205 through the antenna 235.

In the eNB 205, the uplink signal is received from the relay node 210 through the antenna 230. The receiver 290 processes the received uplink signal and acquires samples. Subsequently, the symbol demodulator 295 processes the samples and provides pilot symbols and data symbol estimation values received in uplink. The Rx data processor 297 processes the data symbol estimation values and restores the traffic data transmitted from the relay node 210.

The respective processors 255 and 280 of the relay node 210 and the eNB 205 instruct (for example, control, adjust, or manage) the operations of the relay node 210 and the eNB 205, respectively. The processors 255 and 280 may be connected to the memories 260 and 285 for storing program codes and data, respectively. The memories 260 and 285 are respectively connected to the processor 280 so as to store operating systems, applications and general files.

The processors 255 and 280 may be called controllers, microcontrollers, microprocessors, microcomputers, etc.

The processors 255 and 280 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 255 and 280.

If the embodiments of the present invention are implemented by firmware or software, the firmware or software may be configured to include modules, procedures, functions, etc. for performing the functions or operations of the present invention. The firmware or software configured to perform the present invention may be included in the processors 255 and 280 or may be stored in the memories 260 and 285 so as to be executed by the processors 255 and 280.

Layers of the radio interface protocol between the eNB 205 and the relay node 210 in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The relay node 210 and the eNB 205 exchange RRC messages with each other through a wireless communication network and the RRC layer.

Figure 3:
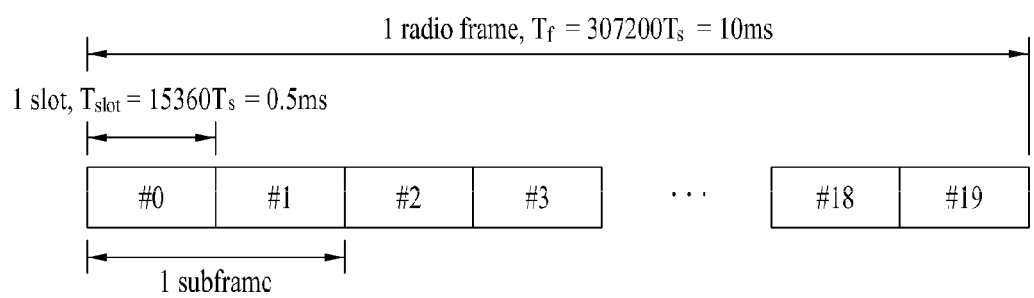
FIG. 3 is a diagram showing the structure of a radio frame used in a 3GPP LTE system which is an example of a mobile communication system.

FIG. 3 is a diagram showing the structure of a radio frame used in a 3GPP LTE system which is an example of a mobile communication system.

Referring to FIG. 3, one radio frame has a length of 10 ms (327200·$T_s$) and includes 10 subframes with the same size. Each subframe has a length of 1 ms and includes two slots. Each slot has a length of 0.5 ms (15360·$T_s$). $T_s$ denotes a sampling time, and is represented by $T_s=1/(15kHz \times 2048)=3.2552 \times 10^{-8}$ (about 33 ns). Each slot includes a plurality of OFDM or SC-FDMA symbols in a time domain, and includes a plurality of resource blocks (RBs) in a frequency domain.

In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 4:
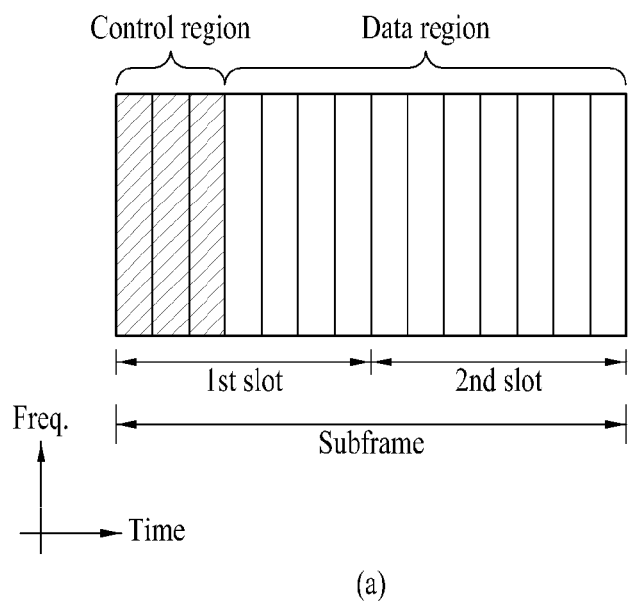
FIG. 4 is a diagram showing the structure of a downlink and uplink subframe in a 3GPP LTE system which is an example of a mobile communication system.
Figure 4:
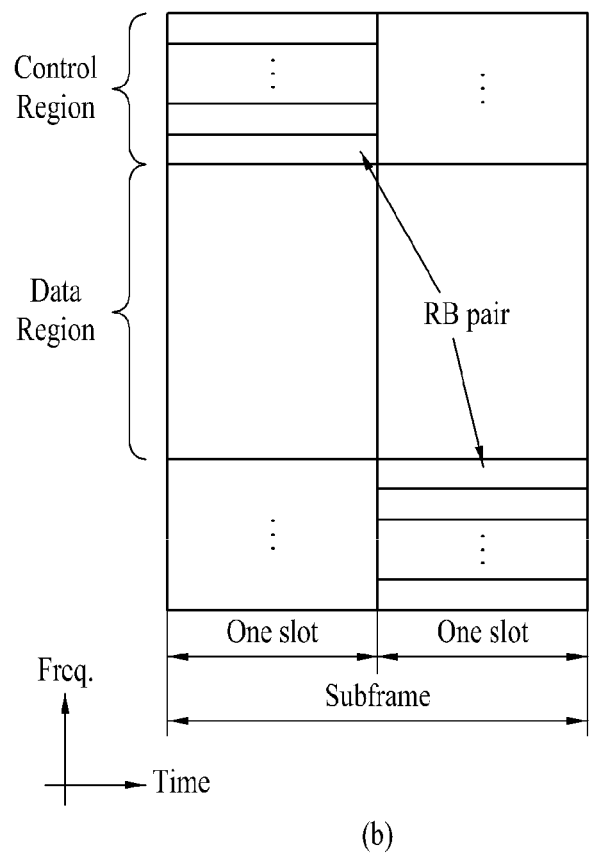

FIG. 4 is a diagram showing the structure of a downlink and uplink subframe in a 3GPP LTE system which is an example of a mobile communication system.

Referring to FIG. 4(a), one downlink subframe includes two slots in a time domain. A maximum of three OFDM symbols located in a front portion of a first slot within the downlink subframe corresponds to a control region to which control channels are assigned, and the remaining OFDM symbols correspond to a data region to which a physical downlink shared channel (PDSCH) is allocated.

Examples of downlink control channels used in the 3GPP LTE system include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols (that is, the size of the control region) used for transmission of control channels within the subframe. Control information transmitted through the PDCCH is referred to as downlink control information (DCI). DCI indicates uplink resource assignment information, downlink resource assignment information, an uplink transmit (Tx) power control command for arbitrary UE groups, etc. The PHICH carries an acknowledgement (ACK)/not-acknowledgement (NACK) signal for uplink hybrid automatic repeat request (HARQ). That is, an ACK/NACK signal for uplink data transmitted by a UE is transmitted on a PHICH.

A PDCCH which is a downlink physical channel will now be described.

An eNB may transmit a transport format and a resource allocation of a physical downlink shared channel (PDSCH) (which is called DL grant), resource allocation information of a PUSCH (which is called UL grant), a set of Tx power control commands for individual UEs within an arbitrary UE group, a Tx power control command, activation of a voice over IP (VoIP) service, etc. through a PDCCH. A plurality of PDCCHs may be transmitted in a control region. A UE may monitor a plurality of PDCCHs. The PDCCH is composed of an aggregation of one or several consecutive control channel elements (CCEs). A PDCCH composed of one or several CCEs may be transmitted in a control region after being subjected to subblock interleaving. The CC is a logical allocation unit used to provide a PDCCH with a coding rate based on a radio channel state. The CCE corresponds to a plurality of resource element groups. A format of the PDCCH and the number of bits of the available PDCCH are determined according to a correlation between the number of CCEs and the coding rate provided by the CCEs.

Control information transmitted through a PDCCH is referred to as downlink control information (DCI). Table 1 shows DCI according to a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, DCI formats 1 to 2 indicate downlink resource allocation information, and DCI formats 3 and 3A indicate uplink transmit power control (TPC) commands for arbitrary UE groups.

A method of mapping resources for PDCCH transmission at an eNB in an LTE system will be briefly described.

In general, an eNB may transmit scheduling allocation information and other control information through a PDCCH. A physical control channel may be transmitted on an aggregation one or a plurality of CCEs. One CCE includes nine resource element groups (REGs). The number of REGs which are not allocated to a physical control format indicator channel (PCFICH) or a physical automatic repeat request indicator channel (PHICH) is $N_{REG}$. CCEs which can be used in a system are 0 to $N_{cCE}-1$ (here, $N_{CCE}=\lfloor N_{REG}/9 \rfloor$). The PDCCH supports multiple formats as shown in Table 2. One PDCCH composed of n consecutive CCEs starts from a CCE for performing i mode n =0 (here, i denotes a CCE number). Multiple PDCCHs may be transmitted via one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the eNB may determine a PDCCH format depending on to how many regions control information is transmitted. In addition, the UE reads control information, etc. in CCE units, thereby reducing overhead. Similarly, a relay node may read control information, etc. in CCE units. In an LTE-A system, resource elements (REs) may be mapped in units of relay-control channel elements (R-CCEs), in order to transmit an R-PDCCH to an arbitrary relay node.

Referring to FIG. 4(b), an uplink subframe may be divided into a control region and a data region in a frequency domain. The control region is allocated to a Physical Uplink Control Channel (PUCCH) carrying uplink control information. The data region is allocated to a Physical uplink Shared Channel (PUSCH) carrying user data. In order to maintain single carrier characteristics, one UE does not simultaneously transmit the PUCCH and the PUSCH. The PUCCH for one UE is allocated to an RB pair in one subframe. RBs belonging to the RB pair occupy different subcarriers with respect to two slots. Thus, the RB pair allocated to the PUCCH is "frequency-hopped" at a slot boundary.

Figure 5:
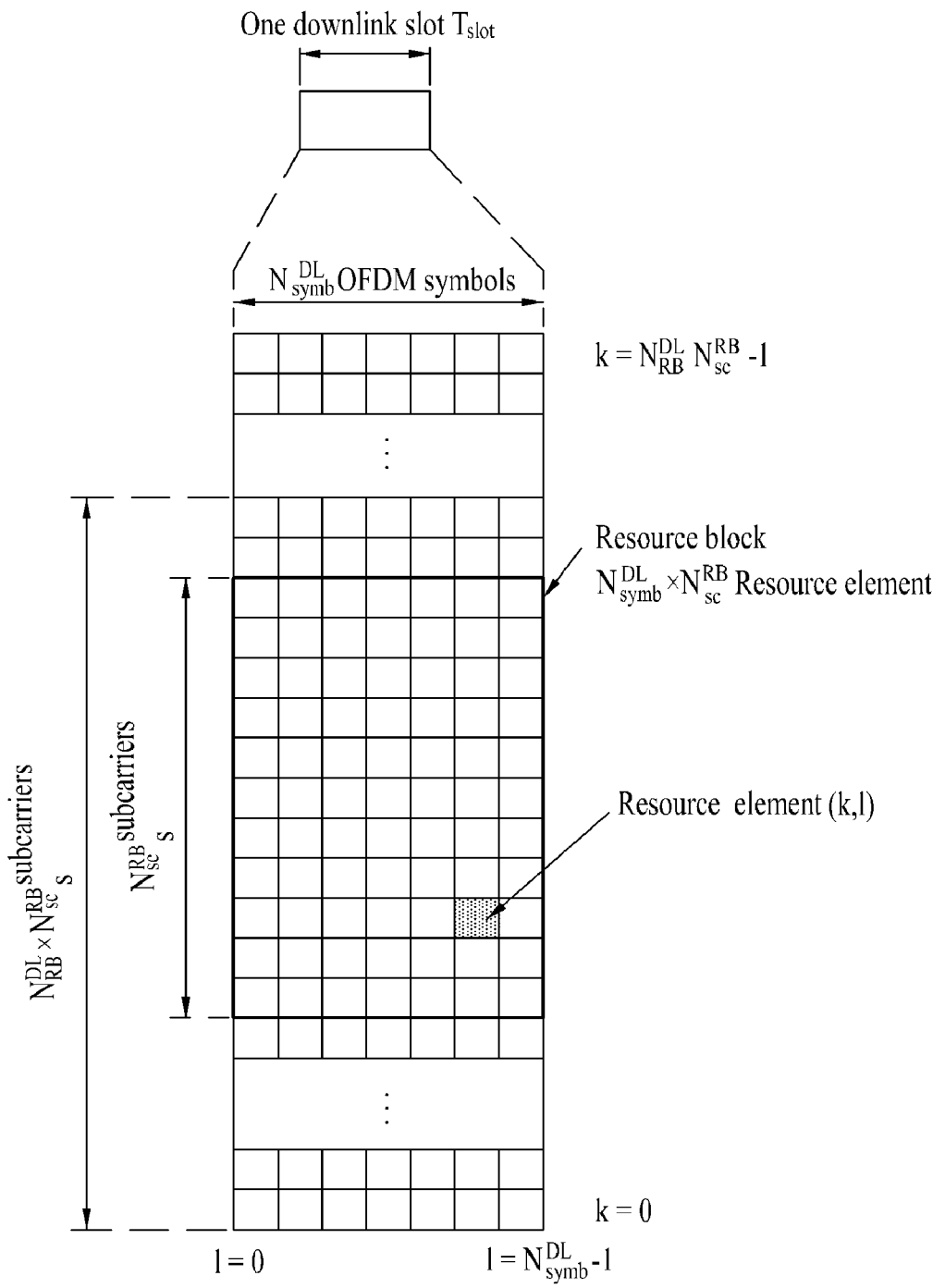
FIG. 5 is a diagram showing a time-frequency resource grid structure of downlink used in the present invention.

FIG. 5 is a diagram showing a time-frequency resource grid structure of downlink used in the present invention.

A downlink signal transmitted at each slot may be used as a resource grid structure including $N_{RB}^{DL} \times N_{SC}^{RB}$ subcarriers and $N_{symb}^{DL}$ orthogonal frequency division multiplexing (OFDM) symbols. Here, $N_{RB}^{DL}$ denotes the number of Resource blocks (RBs) in downlink, $N_{SC}^{RB}$ denotes the number of subcarriers configuring one RB, and $N_{symb}^{DL}$ denotes the number of OFDM symbols in one downlink slot. $N_{RB}^{DL}$ is changed according to a downlink transmission bandwidth configured within a cell and should satisfy $N_{RB}^{min,DL} \leq N_{RB}^{DL} \leq N_{RB}^{max,DL}$. Here, $N_{RB}^{min,DL}$ denotes a minimum downlink bandwidth supported by a wireless communication system and $N_{RB}^{max,RB}$ denotes a maximum downlink bandwidth supported by a wireless communication system. Although $N_{RB}^{min,DL}=6$ and $N_{RB}^{max,RB}=110$, the present invention is not limited thereto. The number of OFDM symbols included in one slot may be changed according to a cyclic prefix (CP) length and a subcarrier interval. In case of multi-antenna transmission, one resource grid may be defined per antenna port.

Each element in the resource grid for each antenna port is referred to as a resource element (RE) and is uniquely identified by an index pair (k, l) in a slot. Here, k denotes an index of a frequency domain, l denotes an index of a time domain, k has any one value of 0, . . . , and $N_{RB}^{DL}N_{SC}^{RB}-1$ and l has any one value of 0, . . . , and $N_{symb}^{DL}-1$.

Resource blocks (RBs) shown in FIG. 5 are used to describe a mapping relationship between physical channels and REs. The RB may be divided into a physical resource block (PRB) and a virtual resource block (VRB). One PRB is defined by $N_{symb}^{DL}$ consecutive OFDM symbols of the time domain and $N_{SC}^{RB}$ consecutive subcarriers of the frequency domain. Here, $N_{symb}^{DL}$ and $N_{SC}^{RB}$ may be predetermined values. For example, $N_{symb}^{DL}$ and $N_{SC}^{RB}$ may be given as shown in Table 3. Accordingly, one PRB includes $N_{symb}^{DL} \times N_{SC}^{RB}$ REs. One PRB corresponds to one slot in the time domain and corresponds to 180 kHz in the frequency domain, but the present invention is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has a value ranging from 0 to $N_{RB}^{DL-1}$ in the frequency domain. A relationship between a PRB number $n_{PRB}$ in the frequency domain and an RE (k, l) within one slot satisfies $$n_{PRB} = \left\lfloor \frac{k}{N_{sc}^{RB}} \right\rfloor.$$

The size of the VRB is equal to that of the PRB. The VRB may be divided into a localized VRB (LVRB) and a distributed VRB (DVRB). With the respective types of VRBs, a pair of VRBs located in two slots of one subframe is allocated a single VRB number $n_{VRB}$.

The VRB may have the same size as the PRB. Two types of VRBs are defined: a first type is a localized VRB (LVRB) and a second type is a distributed VRB (DVRB). With respect to the respective types of VRBs, a pair of VRBs is allocated over two slots of one subframe with a single VRB index (which, hereinafter, may be referred to as a VRB number). In other words, $N_{RB}^{DL}$ VRBs belonging to a first slot between two slots configuring one subframe are allocated any one of indexes from 0 to $N_{RB}^{DL-1}$ and $N_{RB}^{DL}$ VRBs belonging to a second slot between the two slots are similarly allocated any one of indexes from 0 to $N_{RB}^{DL-1}$.

The radio frame structure, the downlink subframe and uplink subframe, the time-frequency resource grid structure of downlink, etc. described with reference FIGS. 3 to 5 are applicable between an eNB and a relay node.

Hereinafter, a process of transmitting a PDCCH from an eNB to a UE in an LTE system will be described. The eNB determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a unique identifier of the UE may be masked to the CRC. If the R-PDCCH is for a specific relay node, a unique identifier of the relay node, e.g., a cell-RNTI (C-RNTI) may be masked to the CRC. Alternatively, if the PDCCH is for a paging message, a paging indicator identifier (P-RNTI) may be masked to the CRC. If the PDCCH or the R-PDCCH is for system information, a system information identifier and a system information RNTI (SI-RNTI) may be masked to the CRC. To indicate a random access response that is a response for transmission of a random access preamble of the UE or the relay node, a random access-RNTI (RA-RNTI) may be masked to the CRC. Table 4 shows an example of identifiers masked to the PDCCH and/or the R-PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If a C-RNTI is used, the PDCCH or the R-PDCCH carries control information for a specific UE or a specific relay node corresponding thereto and, if another RNTI is used, the PDCCH or the R-PDCCH carries common control information received by all or a plurality of UEs or relay nodes in the cell. The eNB performs channel coding with respect to DCI, to which CRC is attached, and generates coded data. The eNB performs rate matching according to the number of CCEs allocated to the PDCCH or R-PDCCH format. Thereafter, the eNB modulates the coded data and generates modulated symbols. The eNB maps the modulated symbols to physical REs.

While the existing 3GPP LTE Release 8 (including Release 9) system is based on transmission and reception on a single carrier band based on a scalable band size, the LTE-advanced system may support downlink transmission using frequency-domain resources (that is, subcarriers or physical resource blocks (PRBs)) on one or more carrier bands in the same time-domain resources (that is, in subframe units) from a cell or an eNB to a UE.

Figure 6:
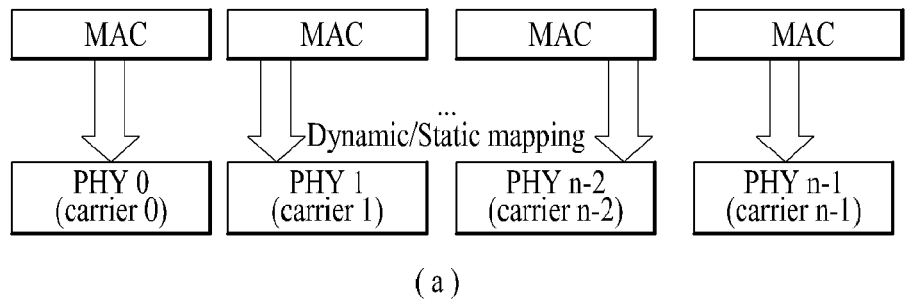
FIG. 6(a) is a diagram illustrating the concept that a plurality of medium access control (MAC) layers manages multiple carriers in an eNB.
FIG. 6(b) is a diagram illustrating the concept that a plurality of MAC layers manages multiple carriers in a UE.
Figure 6:
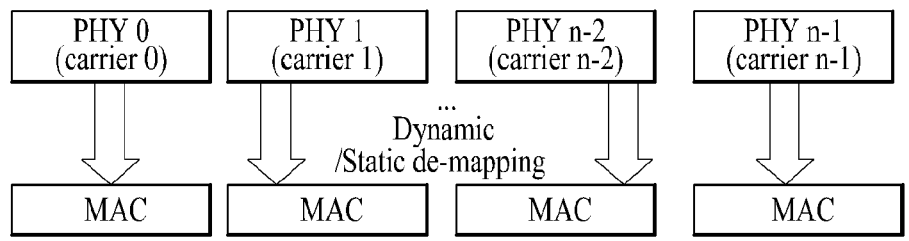
Figure 7:
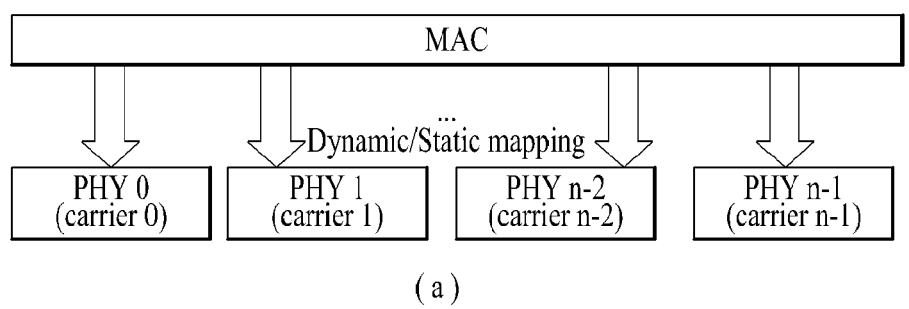
FIG. 7(a) is a diagram illustrating the concept that one MAC layer manages multiple carriers in an eNB.
FIG. 7(b) is a diagram illustrating the concept that one MAC layer manages multiple carriers in a UE.
Figure 7:
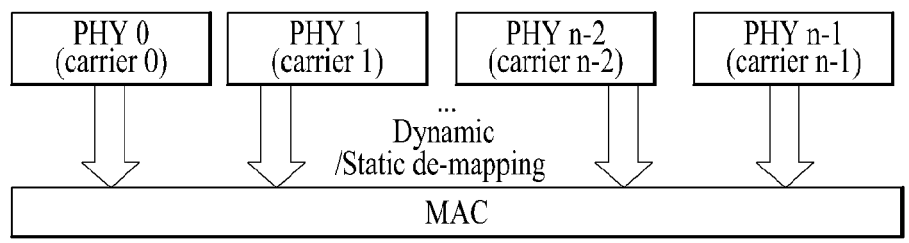

Similarly, the LTE-advanced system may support uplink transmission using frequency-domain resources (that is, subcarriers or physical resource blocks (PRBs)) on one or more carrier bands in the same time-domain resources (that is, in subframe units) from an arbitrary UE to a cell or an eNB. These are referred to as downlink carrier aggregation and uplink carrier aggregation, respectively. The configuration of a physical layer (PHY) and a layer 2 (layer 2 (MAC)) for transmission of a plurality of allocated uplink or downlink carrier bands from the viewpoint of an arbitrary cell or UE is shown in FIGS. 6 and 7.

FIG. 6(a) illustrates the concept that a plurality of MAC layers manages multiple carriers in an eNB and FIG. 6(b) illustrates the concept that a plurality of MAC layers manages multiple carriers in a UE.

As shown in FIGS. 6(a) and 6(b), the MAC layers may control the carriers 1:1. In a system supporting multiple carriers, the carriers may be contiguously or non-contiguously used, regardless of uplink/downlink. A TDD system is configured to manage N carriers each including downlink and uplink transmission and an FDD system is configured to respectively use multiple carriers in uplink and downlink. The FDD system may support asymmetric carrier aggregation in which the numbers of aggregated carriers and/or the bandwidths of carriers in uplink and downlink are different.

FIG. 7(a) illustrates the concept that one MAC layer manages multiple carriers in an eNB and FIG. 7(b) illustrates the concept that one MAC layer manages multiple carriers in a UE.

Referring to FIGS. 7(a) and 7(b), one MAC layer manages one or more frequency carriers so as to perform transmission and reception. Since frequency carriers managed by one MAC layer need not be contiguous, more flexible resource management is possible. In FIGS. 7(a) and 7(b), one PHY layer means one CC for convenience. Here, one PHY layer does not necessarily mean an independent radio frequency (RF) device. In general, one independent RF device means one PHY layer, but is not limited thereto. One RF device may include several PHY layers.

A series of physical downlink control channels (PDCCHs) for transmitting control information of L1/L2 control signaling generated from a packet scheduler of a MAC layer supporting the configurations of FIGS. 7(a) and 7(b) may be transmitted in a state of being mapped to physical resources in a separate CC. At this time, in particular, PDCCHs of grant-related control information or channel assignment associated with transmission of a unique PDSCH or physical uplink shared channel (PUSCH) of a separate UE are divided according to CCs on which the physical shared channel is transmitted, are encoded and are generated as divided PDCCHs, which are referred to as separate coded PDCCHs. As another method, control information for transmitting the physical shared channels of several component carriers may be configured and transmitted as one PDCCH, which are referred to as joint coded PDCCHs.

In order to support downlink or uplink carrier aggregation, an eNB may allocate CCs to be measured and/or reported as a preparation process of establishing a link for transmitting a PDCCH and/or a PDSCH or if a link is established such that a PDCCH and/or a PDSCH for transmitting data and control information are transmitted according to situations on a per specific UE or relay node basis. This is expressed by CC allocation for an arbitrary purpose. At this time, an eNB may transmit CC allocation information via a series of UE-specific or RN-specific RRC signaling (UE-specific or RN-specific RRC signaling) according to dynamic characteristics of control in the case in which the CC allocation information is controlled by L3 radio resource management (RRM) or transmit CC allocation information via a series of PDCCHs as L1/L2 control signaling or via a series of dedicated physical control channels for transmitting only control information.

As another method, in the case in which CC allocation information is controlled by a packet scheduler, the CC allocation information may be transmitted via a series of PDCCHs as L1/L2 control signaling or via a series of dedicated physical control channels for transmitting only control information or PDCCHs of an L2 MAC message format.

Figure 8:
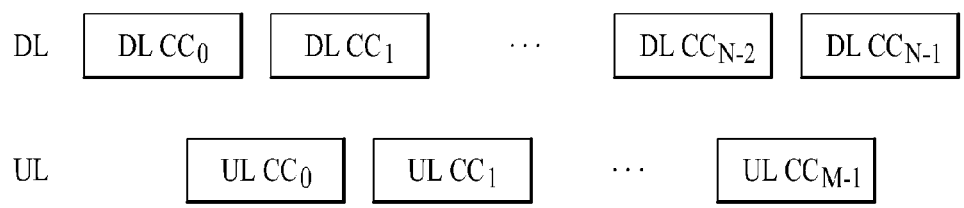
FIG. 8 is a diagram showing component carriers (CCs) configuring downlink and uplink connected to a UE or a relay node in an eNB or relay node area in an LTE-A system.

FIG. 8 is a diagram showing CCs configuring downlink and uplink connected to a UE or a relay node in an eNB or relay node area in an LTE-A system.

Referring to FIG. 8, downlink CCs and uplink CCs allocated by an arbitrary eNB or an arbitrary relay node are shown. For example, the number of downlink CCs is N and the number of uplink CCs is M. Here, the number of downlink CCs may be equal to or different from the number of uplink CCs.

In the LTE-A system, downlink CCs may be classified into three types. As a first type CC, there is a backward compatible CC supporting backward compatibility with an LTE rel-8 UE. As a second type CC, there is a non-backward compatible CC which cannot be accessed by LTE UEs, that is, which support only LTE-A UEs. In addition, as a third type CC, there is an extension CC.

The backward compatible CC which is the first type CC is a CC on which not only a PDCCH and a PDSCH but also a reference signal (RS), a primary-synchronization channel (P-SCH)/secondary-synchronization channel (S-SCH) and primary-broadcast channel (P-BCH) are transmitted according to an LTE structure in order to enable access of an LTE UE.

The non-backward compatible CC which is the second type CC is a CC on which a PDCCH, a PDSCH, an RS, a P-SCH/S-SCH and a P-BCH are transmitted in a modified format in order to disable access of an LTE UE.

The first type CC (that is, the backward compatible CC) enables an LTE UE and an LTE-A UE to access a cell (or eNB) and the second type CC (that is, the non-backward compatible CC) enables only an LTE-A UE to access a cell. The extension CC which is the third type CC disables a UE to access a cell and is referred to as a subsidiary CC of the first type CC or the second type CC. A P-SCH/S-SCH, a P-BCH and a PDCCH are not transmitted on the extension CC which is the third type CC and all resources of the third type CC may be used to transmit a PDSCH to a UE or may operate in a slip mode when the resources are not scheduled with respect to the PDSCH. An eNB or a relay node does not transmit control information to a UE via the third type CC.

That is, the first type CC and the second type CC may be of a stand-alone CC type necessary to establish one cell or capable of configuring one cell and the third type CC may be of a non-stand-alone CC type which coexists with one or more stand-alone CCs.

In the present invention, as a method for supporting a relay node in a cell-based wireless communication system, a method of multiplexing a backhaul link between an eNB and a relay node and an access link between a relay node and a UE shown in FIG. 1 is proposed. In particular, multiplexing of a backhaul link and an access link on a frequency axis using a frequency division multiplexing (FDM) scheme may be considered in order to simultaneously support transmission and reception of a signal between a relay node and an eNB via a backhaul link and transmission and reception of a signal between a relay node and a UE via an access link. Although the present invention is described based on the relay node of the LTE-A system, the present invention is applicable to a general cell-based wireless mobile communication system.

A type-1 relay node is introduced in an LTE-A system as a relay node. The type-1 relay node has a unique physical cell identifier (ID). The type-1 relay node has capability for performing all functions of an eNB for transmitting all physical channels such as a PDSCH, a P-SCH, an S-SCH, a PDCCH and a PBCH. The type-1 relay node appears as one eNB from the viewpoint of a UE. That is, a relay node type of a wireless backhauling eNB configuring a backhaul link with a higher server via a wireless link with an eNB connected thereto is referred to as a type-1 relay node.

Since the type-1 relay node operates as one eNB in the LTE-A system, the type-1 relay node should support backward compatibility (that is, should support an LTE system) which is a requirement of the LTE-A system and thus should transmit a common-reference signal (CRS) of the LTE release-8 via an access link of every subframe. At this time, if a backhaul link between an eNB and a relay node and an access link between a relay node and a UE operate on the same carrier frequency, communication performance of the relay node may be deteriorated. That is, if the relay node receives a signal from the eNB via the backhaul link and, at the same time, transmit a signal to the UE via the access link, communication performance may be significantly deteriorated due to self interference. In order to solve deterioration in communication performance, the frame configuration shown in FIG. 9 may be considered.

Figure 9:
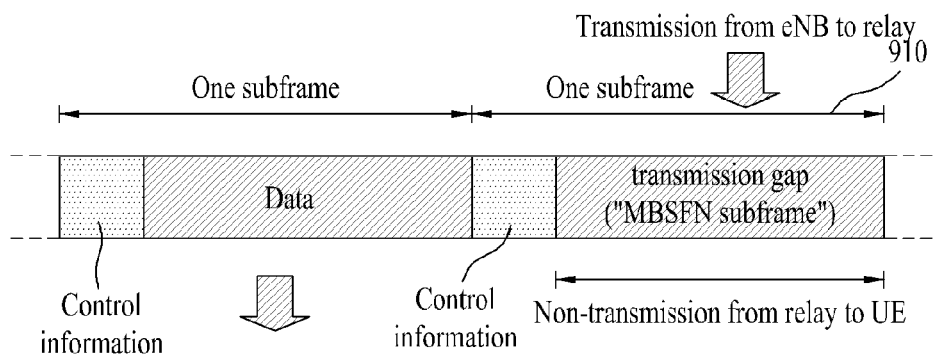
FIG. 9 is a diagram showing the configuration of a frame for multiplexing and supporting a backhaul link and an access link using a TDM scheme in an LTE-A system.

FIG. 9 is a diagram showing the configuration of a frame for multiplexing and supporting a backhaul link and an access link using a TDM scheme in an LTE-A system.

As shown in FIG. 9, an access link and a backhaul link may be multiplexed using a time division multiplexing (TDM) scheme and a relay node introduces a fake-MBSFN subframe 910 for backward compatible backhaul link reception. However, such a method is disadvantageous in that modification is necessary in a hybrid automatic repeat request (HARQ) round trip time (RTT) of an access link and a backhaul link.

In order to solve this disadvantage, in the present invention, a method of multiplexing a backhaul link and an access link using a frequency division multiplexing (FDM) scheme in order to enable the relay node to simultaneously support the backhaul link and the access link within the same subframe is proposed. In particular, a multiplexing method using an FDM scheme according to the above-described CC type will be described.

Figure 10:
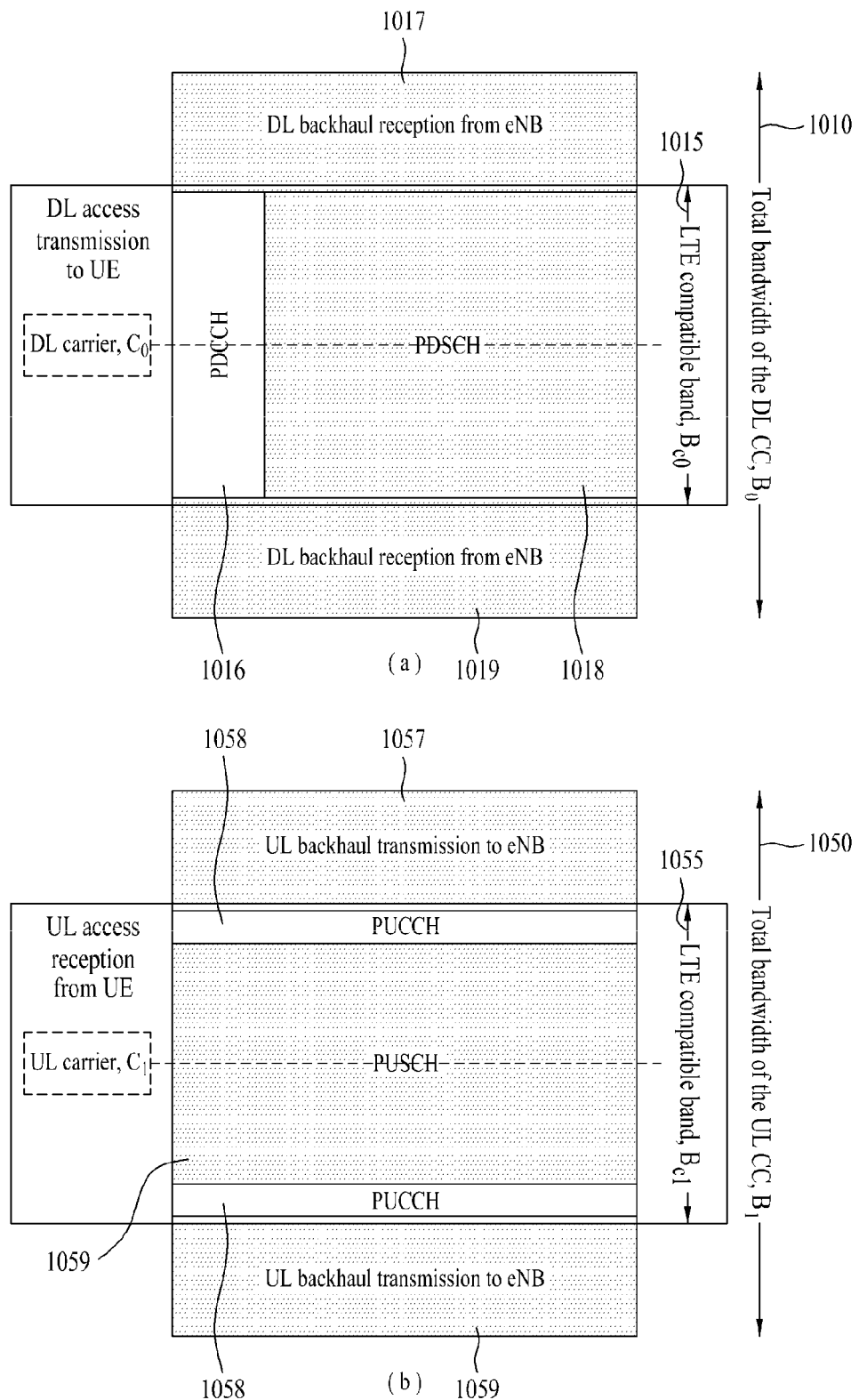
FIG. 10 is a diagram showing an example of multiplexing an access link and a backhaul link using an FDM scheme in a component carrier supporting backward compatibility of a relay node according to the present invention.

FIG. 10 is a diagram showing an example of multiplexing an access link and a backhaul link using an FDM scheme in a CC supporting backward compatibility of a relay node according to the present invention.

As shown in FIGS. 10(a) and 10(b), a backhaul link and an access link may be multiplexed using an FDM scheme within one subframe of a pair of downlink (DL) and uplink (UL) backward CCs supported by the relay node. If the links are multiplexed using the FDM scheme, the access link may be allocated to a band corresponding to the center frequency of CCs 1010 and 1050 as the center. In order to support the access link, a band 1015 supporting an LTE system and an uplink band 1055 supporting an LTE system, which have bandwidths of {1.4, 3, 5, 10, 15, 20} MHz supporting an LTE system, may be allocated. The relay node may transmit and receive a signal to and from an LTE UE and an LTE-A UE via the access link in the bands 1015 and 1055.

The downlink band 1015 supporting the LTE system includes a PDCCH region 1016 and a PDSCH region 1018. Although the case in which the PDCCH region 1016 and the PDSCH region 1018 are multiplexed using a time division multiplexing (TDD) scheme is shown in FIG. 10(a), multiplexing may be performed using an FDM scheme or a combination of a TDM scheme and an FDM scheme.

The relay node may transmit control information to one or more of an LTE UE and an LTE-A UE via the PDCCH region 1016 and transmit downlink data via the PDSCH region 1018. A backhaul region supporting a downlink backhaul link may be allocated to frequency resources 1017 and 1019 outside both edges of the downlink band 1015 supporting the LTE system. The downlink backhaul regions 1017 and 1019 are multiplexed with the downlink band 1015 supporting the LTE system using an FDM scheme.

The relay node may transmit a signal to one or more of an LTE UE and an LTE-A UE via the downlink band 1015 supporting the LTE system and, at the same time, receive a signal from an eNB via the downlink backhaul regions 1017 and 1019.

A backhaul region supporting an uplink backhaul link may be allocated to frequency resources 1057 and 1059 outside both edges of the uplink band 1055 supporting the LTE system. The uplink backhaul regions 1057 and 1059 are multiplexed with the uplink band 1055 supporting the LTE system using an FDM scheme. The uplink band 1055 supporting the LTE system may include a PUCCH region 1058 and a PUSCH region 1059. Although the case in which the PUCCH region 1058 and the PUSCH region 1059 are multiplexed using the FDM scheme is shown in FIG. 10(b), multiplexing may be performed using an TDM scheme or a combination of a TDM scheme and an FDM scheme. The relay node may receive control information from one or more of an LTE UE and an LTE-A UE via the PUCCH region 1058 and receive uplink data via the PUSCH region 1059.

The relay may receive a signal from one or more of an LTE UE and an LTE-A UE via the uplink band 1055 supporting the LTE system and, at the same time, transmit a signal to an eNB via the uplink backhaul regions 1057 and 1059.

The downlink subframe shown in FIG. 10(a) and the uplink subframe shown in FIG. 10(b) are applicable to a time division duplex (TDD) frame structure and a frequency division duplex (FDD) frame structure.

In association with FIG. 10, if backhaul transmission/reception is not performed via a downlink/uplink backhaul region (or link) in an arbitrary downlink/uplink subframe of a relay node, the relay may use the downlink/uplink backhaul region for transmission/reception of the access link of the LTE-A UE. In this case, the relay may receive resource allocation information via a PDCCH region 1016 of the downlink band 1015 supporting the LTE system. Although not shown in FIG. 10, a predetermined guard band for preventing interference may be allocated to boundaries between the downlink band 1015 supporting the LTE system and the downlink backhaul regions 1017 and 1019. Similarly, a predetermined guard band for preventing interference may be allocated to boundaries between the uplink band 1055 supporting the LTE system and the uplink backhaul regions 1057 and 1059.

Figure 11:
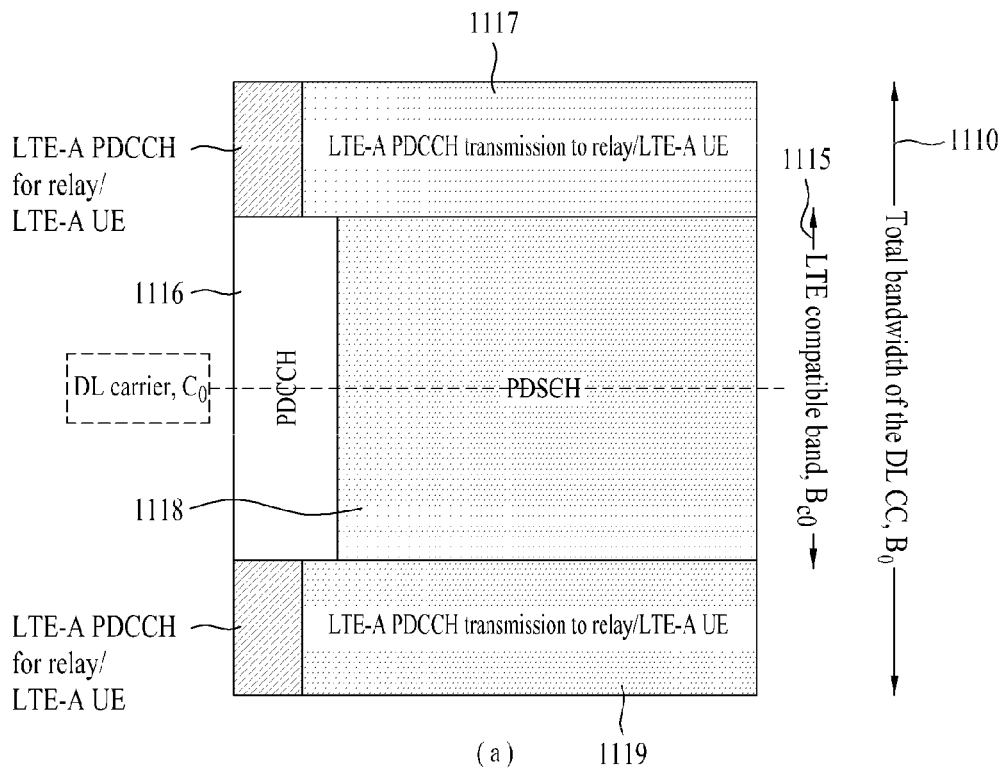
FIG. 11 is a diagram showing an example of a frame structure of an eNB supporting the frame structure of the relay node shown in FIG. 10.
Figure 11:
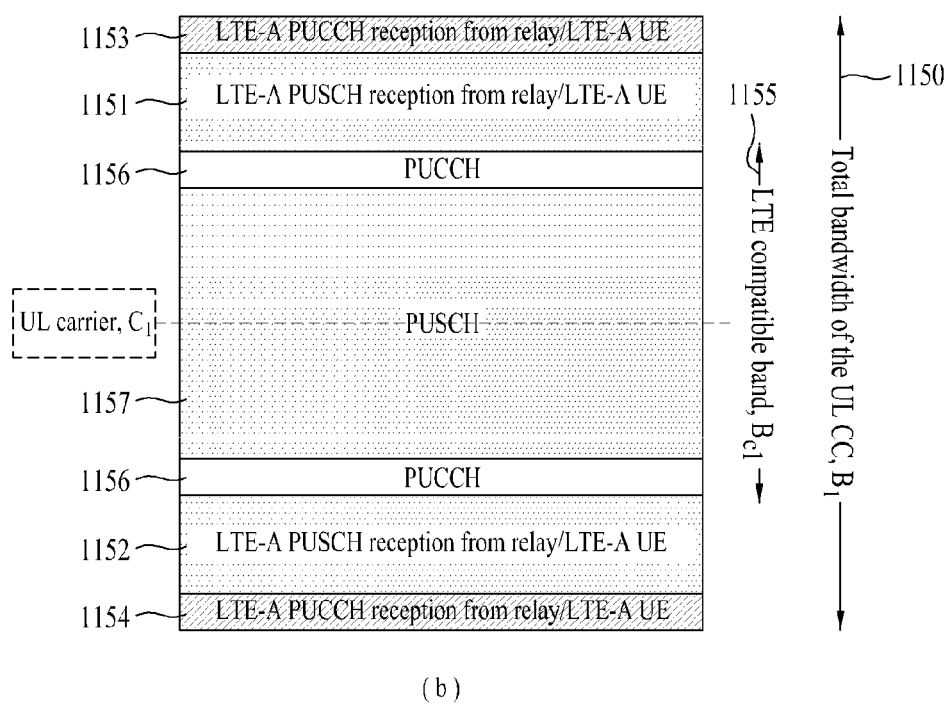

In the frame structure of the relay node, the frame structure of the eNB when the access link and the backhaul link are multiplexed using the FDM scheme in the backward compatible CC is shown in FIG. 11.

FIG. 11 is a diagram showing an example of a frame structure of an eNB supporting the frame structure of the relay node shown in FIG. 10.

As shown in FIGS. 11(*a*) and 11(*b*), a backhaul link and an access link may be multiplexed using an FDM scheme within one subframe of a pair of downlink (DL) and uplink (UL) backward component carriers supported by the eNB. If the links are multiplexed using the FDM scheme, the access link may be allocated to a band corresponding to the center frequency of CCs 1110 and 1150 as the center. In order to support the access link, a band 1115 supporting and an uplink band 1055 supporting an LTE system, which have bandwidths of {1.4, 3, 5, 10, 15, 20} MHz supporting an LTE system, may be allocated. The eNB may transmit and receive a signal to and from an LTE UE and an LTE-A UE via the bands 1115 and 1155.

The downlink band 1115 supporting the LTE system includes a PDCCH region 1116 and a PDSCH region 1118. Although the case in which the PDCCH region 1116 and the PDSCH region 1118 are multiplexed using a time division multiplexing (TDD) scheme is shown in FIG. 11(*a*), multiplexing may be performed using an FDM scheme or a combination of a TDM scheme and an FDM scheme. The eNB may transmit control information to one or more of an LTE UE and an LTE-A UE via the PDCCH region 1116 and transmit downlink data via the PDSCH region 1118.

Frequency resources 1117 and 1119 including a PDCCH region and a PDSCH region for an LTE-A UE or a relay node may be allocated to the outside of both edges of the downlink band 1115 supporting the LTE system. The frequency resources 1117 and 1119 are multiplexed with the downlink band 1115 supporting the LTE system using an FDM scheme. The eNB may transmit a PDCCH for the LTE-A UE or the relay node in a specific region of the resource region 1117 for the LTE-A UE or relay node and transmit a PDSCH in another specific region. The eNB may transmit control information to one or more of an LTE UE and an LTE-A UE via the PDCCH region 1116 of the downlink band 1115 supporting the LTE system and transmit downlink data via the PDSCH 1118.

The uplink band 1155 supporting the LTE system includes a PUCCH region 1156 and a PUSCH region 1157. Although the case in which the PUCCH region 1156 and the PUSCH region 1157 are multiplexed using the FDM scheme is shown in FIG. 11(*b*), multiplexing may be performed using a TDM scheme or a combination of a TDM scheme and an FDM scheme. The eNB may receive control information from one or more of an LTE UE and an LTE-A UE via the PUCCH region 1156 and receive uplink data via the PUSCH region 1157.

Frequency resources 1151, 1152, 1153 and 1154 including a PUCCH region and a PUSCH region for an LTE-A UE or a relay node may be allocated to the outsides of both edges of the uplink band 1155 supporting the LTE system. Although the case in which the PUCCH regions 1153 and 1154 and the PUSCH regions 1151 and 1152 are multiplexed using the FDM scheme is shown, multiplexing may be performed using a TDM scheme or a combination of a TDM scheme and an FDM scheme. The eNB may receive control information and uplink data from the LTE-A UE or the relay node via the PUCCH regions 1153 and 1154 and the PUSCH regions 1151 and 1152 for the LTE-A UE or the relay node.

The subframe shown in FIG. 11(*a*) and the subframe shown in FIG. 11(*b*) are applicable to a TDD frame structure and an FDM frame structure. Although not shown in FIG. 11(*a*), a predetermined guard band for preventing interference may be allocated to boundaries between the downlink band 1115 supporting the LTE system and the PDCCH and PDSCH regions 1157 and 1119 for the LTE-A UE or the relay node. Similarly, a predetermined guard band for preventing interference may be allocated to boundaries between the downlink band 1155 supporting the LTE system and the PUSCH regions 1151 and 1152 for the LTE-A UE or the relay node.

Figure 12:
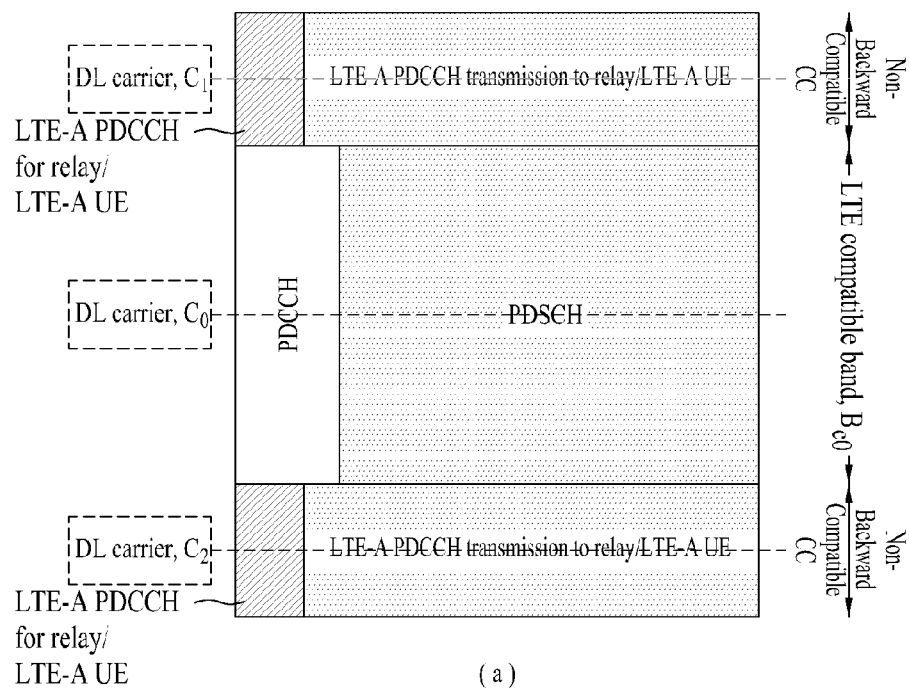
FIG. 12 is a diagram showing another example of a frame structure of an eNB supporting the frame structure of the relay node shown in FIG. 10.
Figure 12:
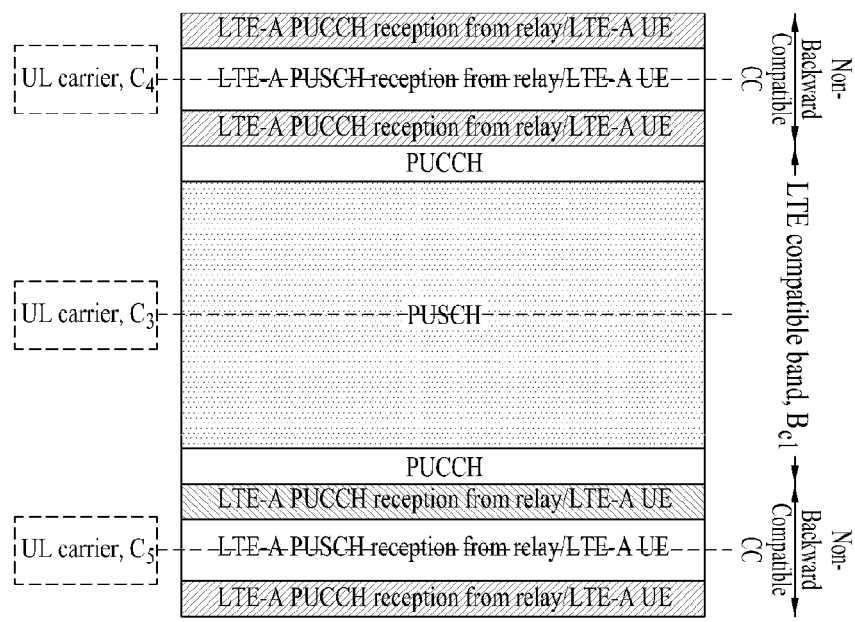

FIG. 12 is a diagram showing another example of a frame structure of an eNB supporting the frame structure of the relay node shown in FIG. 10.

Referring to FIG. 12, a new carrier may be introduced in order to support frequency resources used for backhaul transmission/reception with the relay node. The new carrier includes a backward compatible CC, a non-backward compatible CC and an extension CC.

FIGS. 12(*a*) and 12(*b*) show, for example, frame structures in which a backward compatible CC is introduced such that an eNB supports frequency resources used for backhaul transmission/reception with a relay node.

Figure 13:
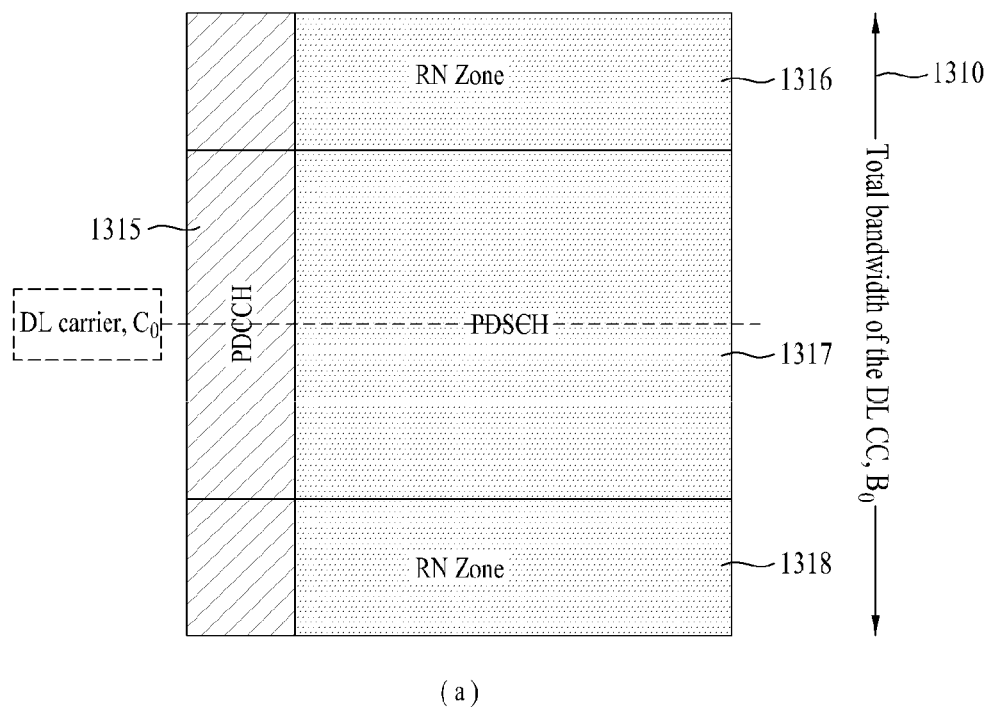
FIG. 13 is a diagram showing another example of a frame structure of an eNB supporting the frame structure of the relay node shown in FIG. 10.
Figure 13:
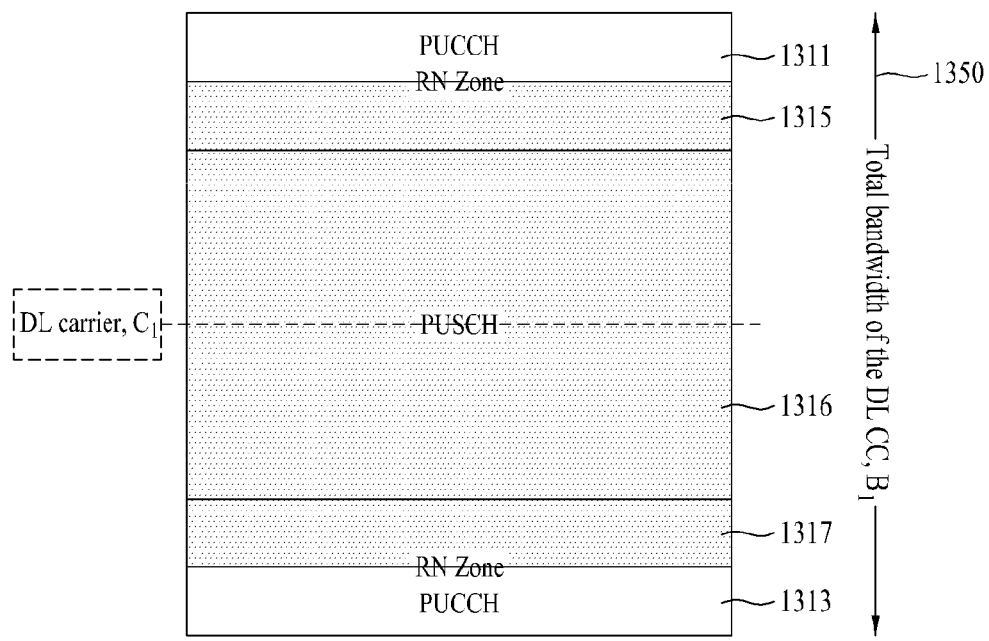

FIG. 13 is a diagram showing another example of a frame structure of an eNB supporting the frame structure of the relay node shown in FIG. 10.

Referring to FIGS. 13(*a*) and 13(*b*), one CC 1310 or 1350 has a total system bandwidth. The eNB may set only frequency resources used for backhaul transmission/reception with the relay node as RN zones 1316, 1318, 1315 and 1317. A method of scheduling a PDCCH, a PDCCH, a PUSCH and a PUCCH through the RN zone at the eNB may be considered. That is, the eNB may transmit an R-PDCCH carrying control information for the relay node to the relay node only via the RN zones 1316 and 1318 in downlink. Similarly, the eNB may receive an R-PUSCH carrying control information for the relay node only via the RN zones 1315 and 1317 in uplink.

The eNB may transmit the PDCCH 1315 carrying control information for the LTE UE and the LTE-A UE over the whole band.

Referring to FIG. 13(*b*), the PUCCH regions 1311 and 1313 may be allocated to frequency resources located at both edges of the system bandwidth.

Figure 14:
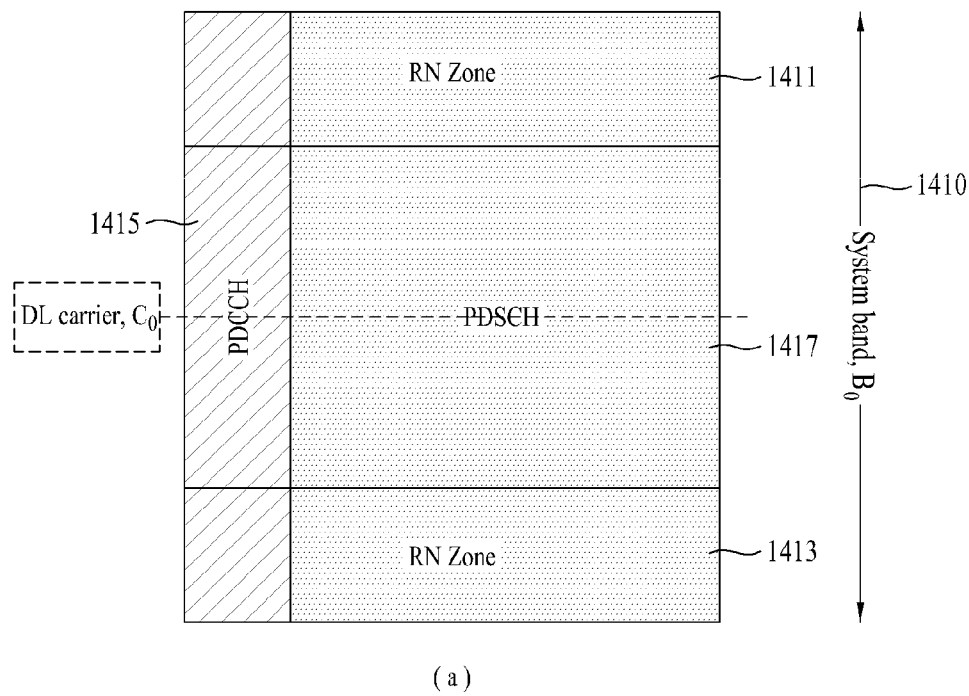
FIG. 14 is a diagram showing another example of a frame structure of an eNB supporting the frame structure of the relay node shown in FIG. 10.
Figure 14:
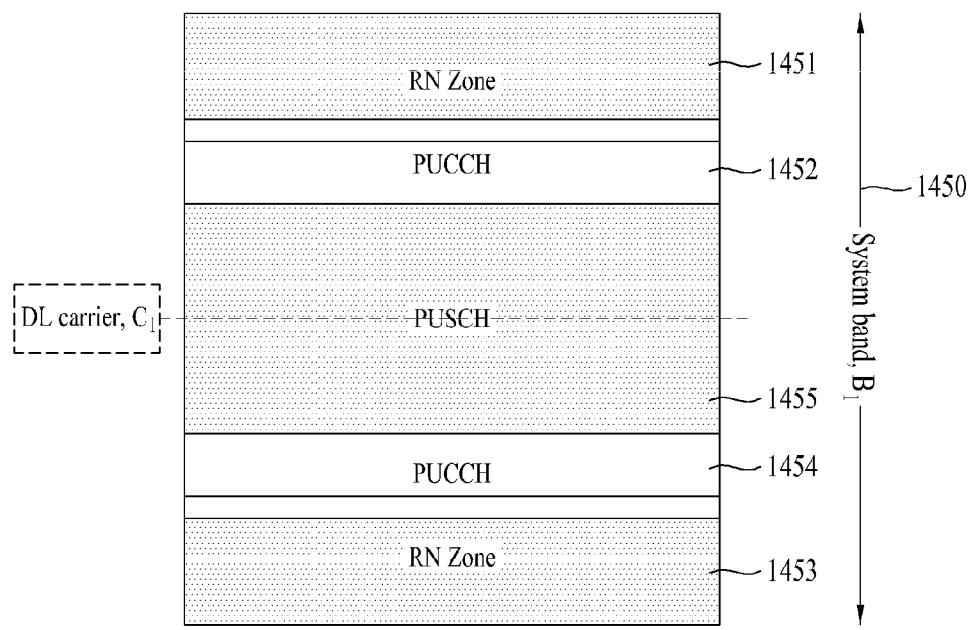

FIG. 14 is a diagram showing another example of a frame structure of an eNB supporting the frame structure of the relay node shown in FIG. 10.

The downlink frame structure shown in FIG. 14(*a*) is equal to the downlink frame structure shown in FIG. 13(*a*). However, referring to FIG. 14(*b*), PUCCHs 1452 and 1454 may not be allocated to both edges of the system bandwidth, but may be allocated to the RN zone, in order to secure backhaul link PUSCH resources in uplink.

The frame structures of the relay node and the eNB described up to now may be set when the relay node is introduced into a specific cell and the eNB may transmit the frame configuration information of the eNB and the relay node to the relay node through cell-specific RRC signaling or RN-specific RRC signaling.

Although the FDM multiplexing structure of the downlink/uplink backward compatible CC of the relay node is described above, the same structure is applicable to a non-backward compatible CC or an extension CC. In this case, a band supporting an LTE system in order to support an access link set in a subframe of a CC of a relay node according to CC type may be changed to the structure of a non-backward compatible band which does not support the LTE system or an extension band.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

[Industrial Applicability]

A relay node apparatus for simultaneously transmitting and receiving a signal and a method thereof according to the present invention are industrially applicable to a wireless communication system such as a 3GPP LTE, LTE-A or IEEE 802 system.

The invention claimed is:

1. A method of transmitting and receiving a signal at a relay node (RN) in a wireless communication system, the method comprising:
   receiving a signal at the RN from a base station (BS) via a first region of a first downlink subframe on a downlink component carrier supporting first and second wireless communication schemes; and,
   transmitting a signal from the RN to of at least one first type user equipment (UE) using the first wireless communication scheme and at least one second type UE using the second wireless communication scheme via a second region of the first downlink subframe on the downlink component carrier, simultaneously with the receiving, and
   wherein the first and second regions are regions multiplexed by a frequency division multiplexing (FDM) scheme in the first downlink subframe,
   wherein the first region includes two regions multiplexed by the FDM scheme in the first downlink subframe and the two regions are located at both edges of a bandwidth of the downlink component carrier,
   wherein the first region is located at center frequency of the bandwidth of the downlink component carrier,
   wherein a guard band is located between each of the two regions and the second region.

2. The method according to claim 1, further comprising:
   receiving, at the RN from the BS, frame configuration information for the RN,
   wherein the receiving and the transmitting are based on the frame configuration information.

3. The method according to claim 2, wherein the frame configuration information is received through a radio resource control (RRC) signaling.

4. A method of transmitting and receiving a signal at a relay node (RN) in a wireless communication system, the method comprising:
   transmitting a signal from the RN to a base station (BS) via a first region of a first uplink subframe on an uplink component carrier (CC) supporting first and second wireless communication schemes; and,
   receiving a signal at the RN from at least one first type user equipment (UE) using the first wireless communication scheme and at least one second type UE using the second wireless communication scheme via a second region of the first uplink subframe on the uplink component carrier, simultaneously with the transmitting, and
   wherein the first and second regions are regions multiplexed by a frequency division multiplexing (FDM) scheme in the first uplink subframe,
   wherein the first region includes two regions multiplexed by the FDM scheme in the first uplink subframe and the two regions are located at both edges of a bandwidth of the Uplink Component carrier,
   wherein the first region is located at center frequency of the bandwidth of the uplink component carrier, and
   wherein a guard band is located between each of the two regions and the second region.

5. The method according to claim 4, further comprising:
   receiving, at the RN, frame configuration information from the BS,
   wherein the receiving and the transmitting are based on the frame configuration information.

6. The method according to claim 5, wherein the frame configuration information is received through a radio resource control (RRC) signaling.

7. A relay node (RN) apparatus for transmitting and receiving a signal in a wireless communication system, the relay node apparatus comprising:
   a receiver configured to receive a signal at the RN from a base station (BS) via a first region of a first downlink subframe on a downlink component carrier supporting first and second wireless communication schemes; and
   a transmitter configured to transmit a signal from the RN to least one first type user equipment (UE) using the first wireless communication scheme and at least one second type UE using the second wireless communication scheme via a second region of the first downlink subframe on the downlink component carrier, simultaneously with the reception, and
   wherein the first and second regions are regions multiplexed by a frequency division multiplexing (FDM) scheme in the first downlink subframe,.
   wherein the first region includes two regions multiplexed by the FDM scheme in the first downlink subframe and the two regions are located at both edges of a bandwidth of the downlink component carrier,
   wherein the first region is located at center frequency of the bandwidth of the downlink component carrier, and
   wherein a guard band is located between each of the two regions and the second region.

8. The relay node apparatus according to claim 7, wherein the receiver is further configured to receive frame configuration information for the RN from the BS,
   wherein the receiver is configured to receive the signal based on the frame configuration information, and wherein the transmitter is configured to transmit the signal based on the frame configuration information.

9. The relay node apparatus according to claim 8, wherein the frame configuration information is received through a radio resource control (RRC) signaling.

10. A relay node (RN) apparatus for transmitting and receiving a signal in a wireless communication system, the relay node apparatus comprising:
- a transmitter configured to transmit a signal from the RN to a base station via a first region of a first uplink subframe on a uplink component carrier supporting first and second wireless communication schemes; and
- a receiver configured to receive a signal at the RN from at least one first type user equipment (UE) using the first wireless communication scheme and at least one second type UEs using the second wireless communication scheme via a second region of the first uplink subframe on the uplink component carrier, simultaneously the transmission, and wherein the first and second regions are regions multiplexed by a frequency division multiplexing (FDM) scheme in the first uplink subframe,.

wherein the first region includes two regions multiplexed by the FDM scheme in the first uplink subframe and the two regions are located at both edges of a bandwidth of the component carrier, wherein the first region is located at center frequency of the bandwidth of the uplink component carrier, and wherein a guard band is located between each of the two regions and the second region.

11. The relay node apparatus according to claim 10, wherein the receiver is further configured to receive frame configuration information from the BS, wherein the receiving and the transmitting are based on the frame configuration information.

12. The relay node apparatus according to claim 11, wherein the frame configuration information is received through a radio resource control (RRC) signaling.

* * * * *